(12) United States Patent
Adlersberg et al.

(10) Patent No.: US 10,963,505 B2
(45) Date of Patent: Mar. 30, 2021

(54) DEVICE, SYSTEM, AND METHOD FOR AUTOMATIC GENERATION OF PRESENTATIONS

(71) Applicant: AudioCodes Ltd., Lod (IL)

(72) Inventors: Shabtay Adlersberg, Ra'anana (IL); Menachem Shmuel Honig, Metar (IL); Tatiana Adar, Belle Mead, NJ (US)

(73) Assignee: AUDIOCODES LTD., Lod (IL)

( * ) Notice: Subject to any disclaimer, the term of this patent is extended or adjusted under 35 U.S.C. 154(b) by 0 days.

(21) Appl. No.: 16/260,160

(22) Filed: Jan. 29, 2019

(65) Prior Publication Data
US 2020/0242151 A1    Jul. 30, 2020

(51) Int. Cl.
| | |
|---|---|
| *G06F 16/438* | (2019.01) |
| *G06F 16/432* | (2019.01) |
| *G06F 16/483* | (2019.01) |
| *G06F 16/955* | (2019.01) |
| *G06Q 10/10* | (2012.01) |
| *G06F 16/587* | (2019.01) |
| *G06F 40/56* | (2020.01) |

(52) U.S. Cl.
CPC ........ *G06F 16/4393* (2019.01); *G06F 16/433* (2019.01); *G06F 16/483* (2019.01); *G06F 16/587* (2019.01); *G06F 16/9558* (2019.01); *G06F 40/56* (2020.01); *G06Q 10/1095* (2013.01)

(58) Field of Classification Search
CPC .... G06F 16/4393; G06F 16/483; G06F 40/56; G06F 16/433; G06F 16/9558; G06F 16/587; G06Q 10/1095
USPC ........................................................ 715/730
See application file for complete search history.

(56) References Cited

U.S. PATENT DOCUMENTS

| | | | |
|---|---|---|---|
| 2005/0044499 A1* | 2/2005 | Allen | G06F 16/4393 715/704 |
| 2019/0273767 A1* | 9/2019 | Nelson | H04L 65/4015 |

\* cited by examiner

*Primary Examiner* — Andrey Belousov
(74) *Attorney, Agent, or Firm* — Eitan Mehulal Sadot

(57) ABSTRACT

Devices, systems, and methods for automatically generating presentations, and for automatically generating a visual presentation that corresponds to a verbal meeting in which one or more topics were discussed. A method includes: obtaining an audio recording of a meeting; generating a transcript of the meeting from the audio recording; and automatically generating a visual presentation that corresponds to particular key elements of the meeting. The generated visual presentation includes automatically-generated slides or portions or chapters, which correspond to the agenda of the meeting, topics discussed and their summary, conclusions, decisions, action items, and other key elements of the meeting.

19 Claims, 1 Drawing Sheet

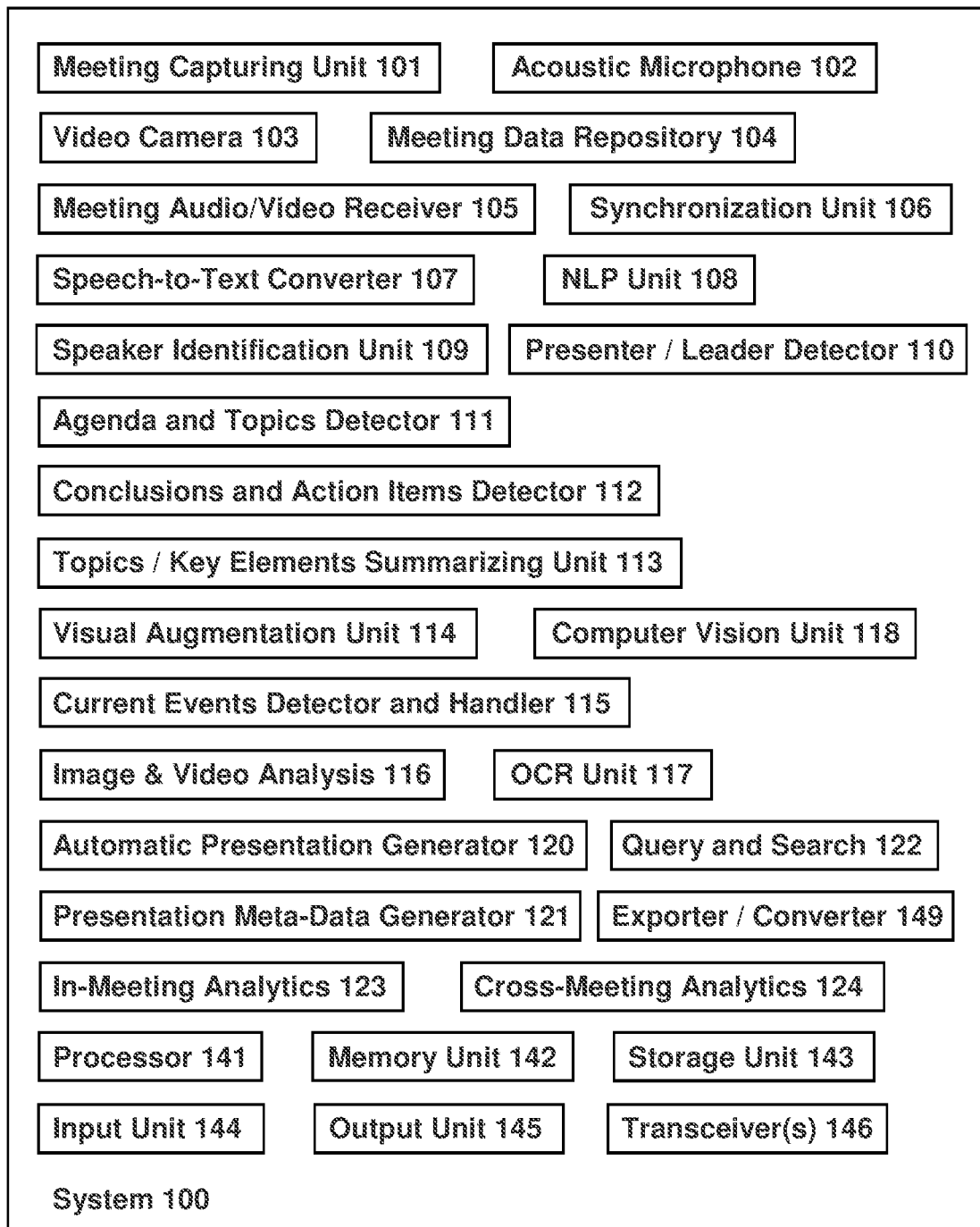

DEVICE, SYSTEM, AND METHOD FOR AUTOMATIC GENERATION OF PRESENTATIONS

FIELD

The present invention is related to the field of Information Technology.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

The present invention may include, for example, systems, devices, and methods for automatically generating presentations, and/or for automatically generating a visual representation which corresponds to a meeting or a discussion in which one or more topics were discussed. Such meeting may be, for example, a face-to-face/in-person meeting, a telephonic conference meeting, a video conference meeting, a hybrid or mixed meeting in which different users participate via different means, or other types of meetings.

The present invention may provide other and/or additional benefits or advantages.

BRIEF DESCRIPTION OF THE DRAWINGS

FIG. 1 is a schematic block-diagram illustration of a system, in accordance with some demonstrative embodiments of the present invention.

DETAILED DESCRIPTION OF SOME DEMONSTRATIVE EMBODIMENTS

The Applicants have realized that many people utilize a presentation in meetings: the presentation helps the presenter to focus on the important messages that he wants to convey or discuss, and it is also important for the other participants or the audience in order to focus on these messages and/or to remember the topics.

The Applicants have realized that a presentation may have other benefits; for example, since "a picture is worth a thousand words", adding a graphical slide, image or item to a presentation, may help the presenter to clarify a particular message, and/or may cause some of the other participants to better remember that particular message due to the accompanying picture.

The Applicants have further realized that it may be beneficial to have, at the beginning of a meeting, a written agenda of the meeting made available to the participants; and/or to have, at the end of the meeting, a summary of the topics discussed, the conclusions reached, the decisions reached, and the action items that were allocated to participants. Such agenda in advance, and summary at the end, may contribute to the efficiency of the meeting and/or to the follow-up handling of topics discussed therein.

The Applicants have realized that numerous meetings take place, as face-to-face meetings or as phone conference meetings or as video-conference meetings, without advance preparation of a presentation, and/or without preparing or distributing in advance a written agenda of topics, and/or without preparing or distributing after the meeting a written summary or a write-up of the conclusions or decisions or action items. The Applicants have also realized that for some meetings or discussions, the meeting leader or presenter, or an appointed participant or an assistant, is tasked with manually preparing a summary of the meeting or discussion; however, this is a time-consuming task, and the time and effort spent by such team-member can be shifted to other, more productive, tasks that the organization may need, if the system of the present invention operates to automatically generate the summary of the meeting or discussion instead of leaving this task to a human team-member.

The Applicants have also realized that in many meetings, the presenter or one or more of the participants may convey an interesting idea, which then gets lost or forgotten in the general conversation without being reflected in an already-written presentation that was prepared in advance for the meeting, and without being reflected in a summary of conclusions or decisions that was manually prepared regarding the meeting.

The Applicants have further realized that an automatic generation of a visual presentation, with regard to a meeting or a discussion that took place, may later assist the participants and/or the presenters and/or third parties (e.g., co-workers, legal department, accounting department, or the like) to capture the essence of the meeting and to follow-up on the performance and completion of action items that were discussed or presented at such meeting. Moreover, the automatic insertion or inclusion of graphical items (e.g., images, photographs, designed logos, or the like), into such automatically-generated presentation, may further assist such users in remembering key elements from the meeting and/or in focusing such users on specific points or items that were presented or discussed.

The present invention provides systems and method that may utilize, for example, voice transcription (speech to text engine), speaker identification, textual/contextual analysis, Natural Language Processing (NLP) or Natural Language Understanding (NLU), automatic retrieval of additional information from the Internet and/or from a local repository (e.g., an organizational or enterprise repository) and/or from third-party databases, as well as artificial intelligence (AI) and/or other functionalities, in order to determine and analyze "who said what" in a meeting or a discussion or a presentation, and to generate a visual presentation that includes textual and/or graphical components that correspond to key elements that were discussed or presented, and/or that further expand on such key elements; thereby analyzing what was said or discussed in a meeting, and automatically generating from it a visual layer that corresponds to it.

Some embodiments may automatically create, in an autonomous or artificial manner, a "post mortem" presentation that corresponds to the meeting or the discussion, as if the presenter and/or the participants would have created such presentation before the meeting or before the discussion; and optionally also including within such presentation additional materials or ideas or to-do items or action items that were discussed or presented in the meeting (or discussion) without necessarily being planned in advance by the presenter, thereby generating a visual presentation that may be, in some situation, even better in its quality than a presentation that was prepared in advance prior to the meeting and which does not necessarily reflect the actual discussion in the meeting, or that misses or lacks important portions that were discussed in the meeting without necessarily being planned ahead as discussion points. Such automatically-generated presentation may include multiple components or slides or pages or chapters; for example, a subject or title or main topic of the meeting; an agenda of topics and sub-topics discussed; a textual and/or visual portion that corresponds to each topic/sub-topic as discussed; decisions and conclusions; action items or "to do" items, or allocation of tasks to particular persons or entities; summary; questions that need to be further researched or answered; data and meta-data about the meeting (e.g., list of participants; list of active participants who talked; list of silent participant who attended but did not talk; name of presenter(s); date and time of the meeting; date and time, or time-slots, in which each participant talks; talking time of each participant; aggregate talking time of all participants; relative ratio of talking times of participants (e.g., participant Adam talked during 40% of the meeting length, whereas participant Bob talked during 5% of the meeting length); identification of order or repeating order of talking (e.g., automatic identification that participant Adam, in 90 percent of his talks, has talked immediately after participant Bob; or other data or analyzed data regarding talking time of participants in the meeting or the discussion); or the like.

Such data may be automatically generated and organized in a searchable format, which enables the organization or users to later retrieve and search through the data; such as, by utilizing search queries of "show me the presentations for all meetings that discussed the Acme Product", or "show me all the slides in this presentation that refer to the Acme Product", or "show me all slides or portions in this presentation that reflect input or utterances by participant John Smith", or "show me all action items from all meetings that took place in November 2018 and that mentioned at least once the Acme Product", or the like; and the system may parse such or similar queries, may search the data and/or meta-data of automatically-generated presentations, and may output the relevant portions or slides from the relevant presentation(s); thereby making use of past meetings, of past discussion, and of the automatically-generated presentations that correspond to them.

The system may automatically add visual, textual and/or graphical content from external sources that are external to the meeting itself; for example, if the meeting included a discussion of a recent real-world event (e.g., hurricane in Florida; or municipal elections in Los Angeles), then the system may automatically obtain text and/or graphics and/or content-items (e.g., including also news articles, or hyperlinks to news articles) that correspond to such that event(s) and/or that provide additional data about such events. Similarly, if a particular corporation or organization or person was discussed (e.g., at least one time during the meeting, or at least N times during the meeting), then the automatically-generated presentation may further comprise a graphical item of the logo of that corporation or organization, or of the image of that person, or the like. Such automatically-generated visual items serve not only in order to beautify the generated presentation, but rather, they also serve as attention-grabbing content-items that may assist a user to consume, understand and/or remember the relevant portions of the meeting and/or to act on them and/or to focus the user's attention on particular elements in the meeting, thereby assisting users to later review the meeting content in a useful and efficient manner, and/or assisting users to memorize such content and/or to process it more efficiently.

Some embodiments of the present invention may automatically generate "from scratch" a comprehensive, visual, presentation that corresponds to a meeting or discussion that took place, without the need to provide to the system any slide(s) or content other than an audio recording or an audio input from the meeting, which the system then autonomously analyzes. Other embodiments may utilize some, or all, of a previously-prepared presentation that may have been prepared for the meeting, and may revise or expand or modify such previously-prepared presentation in order to make it reflect the actual discussions that took place in real-life in the meeting, and/or may add new slides or artificial slides to such presentation, or may augment or modify the content of particular slide(s) of the previously-prepared presentation.

The terms "meeting" or "discussion" as used herein may include, for example, a face-to-face meeting, a telephonic meeting, a telephone conference call, a video meeting, a video conference call, a hybrid or mixed meeting in which one or more users participate in person and/or one or more other users participate via telephone and/or one or more other users participate via video conferencing and/or one or more other users participate via other means (e.g., via a messaging application or a chat application), or the like.

Reference is made to FIG. 1, which is a schematic block diagram illustration of a system 100, in accordance with some demonstrative embodiments of the present invention.

System 100 may comprise a Meeting Capturing Unit 101, able to capture and/or record and/or acquire audio and/or video and/or audio-video of a meeting. For example, an acoustic microphone 102 may capture audio of a meeting; and optionally, a video camera 103 or imager may capture video or audio-and-video of a meeting. The captured audio/video data is stored in a Meeting Data Repository 104. Additionally or alternatively, such audio and/or video may be received from an external source, such as, from a tele-conferencing service that is operated by a third party; for example, a Meeting Audio/Video Receiver 105 may receive audio/video of such meeting from the external source or from the third-party, and may store it (in its original format, or after being reformatted) in the Meeting Data Repository 104.

In some embodiments, audio/video data of a single meeting may reach the Meeting Data Repository 104 from multiple sources, for example, from an audio microphone that recorded the meeting within a conference room in which several participants have attended in person, as well as from a tele-conferencing service or a "telephonic bridge" service which provided a telephonic bridge or a teleconferencing service or a video-conference service to some other participants in that meeting that did not attend the conference room in person but rather have attended the meeting remotely via such remote access tools.

A synchronization unit 106 may perform initial analysis of the audio and/or video data from all sources, and may normalize the data or may determine the overlapping and/or the non-overlapping portions of such multiple data streams or data sources. For example, the synchronization unit 106 may analyze the data and may detect that the acoustic microphone within the conference room has provided an audio recording of the entire meeting from 11:00 AM until 11:45 AM; whereas, the tele-conferencing service has provided an audio recording of almost (but not all) of the entire meeting, from 11:03 AM until 11:42 AM. The synchronization unit 106 may thus detect that there may be some meeting-portions that are reflected only in the audio captured by the local microphone within the conference room, and that are not reflected in the tele-conference recorded audio. The synchronization unit 106 may optionally flag or otherwise notify this scenario to other components of the system, to notify or to alert them that there are non-overlapping portions of the meeting that exist only in a particular source and not in other source(s) of audio and/or video.

A speech-to-text converter 107 may process all the audio from all sources, and may generate a textual transcript of the discussions held in the meeting. Optionally, a Natural Language Processing (NLP) unit 108 may perform initial analysis or the transcript, in order to improve it and/or to fine-tune it or to remove ambiguities or to make corrections. For example, participant Adam said during the meeting "we need two cars for this project"; the speech-to-text converter 107 may initially transcribe this phrase as "we need to cars for this project"; and the NLP unit 108 may then fine-tune and correct this to be "we need two cars for this project" based on an NLP analysis that detects the plural form "cars" after the word "two", and that selects it to be "two" rather than "to" or "too".

A speaker identification unit 109 may further analyze the audio/video data, and/or the generated transcript, and/or other meta-data; and may identify that a particular participant has spoken at particular time-slots; and may tag or mark his utterances or his audio-portions as belonging to him. In some embodiments, the speaker identification may be based on contextual analysis of content; for example, if Participant A said "I often ask myself, James, how can we fix this problem?", then the speaker identification unit 109 may determine that Participant A is James. Similarly, if Participant B said "What do you, Bob, think about this?", and then Participant C says "Well, Rachel, this is a great question", then the speaker identification unit 109 may determine that Participant B is Rachel and that Participant C is Bob. In another example, the audio recording of the meeting may be correlated with data from a scheduling application or a calendar application, in order to obtain data or meta-data that can be used for speaker identification; for example, the calendar entry for the Northern Conference Room may show a meeting that took place from 11:00 AM to 11:45 AM, with participants "Rachel, Bob, James"; the speaker identification unit 109 may identify a female voice based on a higher frequency or higher pitch of utterances, or based on contextual analysis (e.g., a participant responds with "I think she is right in which she has just said"), thereby determining that a particular participant is female, and correlating this determination with calendar/scheduling data in order to deduce that this female participant is Rachel. The speaker identification unit 109 may augment or modify the transcript of the meeting, by adding to eat the actual names of participants; or, at least, by adding to the transcript generic place-holders such as "Participant A" and "Participant B" and "Participant C" if they real names cannot be deduced based on the current data.

The speaker identification unit 109 may further utilize a Presenter/Leader Detector 110 to determine which participant is the presenter or leader of the meeting; for example, based on contextual analysis of audio (e.g., the first participant who talked and said "I have initiated this meeting in order to discuss our goals", is thus identified as the Presenter/Leader of the meeting), and/or based on meta-data such as the length of time that each participant talked (e.g., Participant A has talked 80 percent of the meeting; Participant B has talked 12 percent of the meeting; Participant C has talked 8 percent of the meeting; therefore Participant A is determined to be the presenter/leader of that meeting).

An Agenda and Topics Detector 111 analyzes the transcript of the meeting and/or other data or meta-data, in order to extract or determine the planned agenda that is presented and/or the topics (and sub-topics) that are discussed. For example, an NLP unit may analyze the transcript, and may identify the agenda based on a phrase that Participant B said within the first N minutes (e.g., within the first 3 minutes) of the meeting, such as, "The purpose of this meeting is to discuss how to market our Acme Product in Europe"; and may thus determine the Agenda of that meeting to be "Marketing the Acme Product in Europe". Similarly, a textual or contextual analysis of the transcript by the Agenda and Topics Detector 111 may detect a phrase such as "We now turn to discuss the budget that would be required in year 2019 for this marketing campaign" at time-point 11:27 AM, and may further detect the words "budget" and "marketing campaign" uttered several more times between 11:27 AM to 11:32 AM, thereby leading the Agenda and Topics Detector 111 to determine that a topic of "Budget for Marketing Campaign" was discussed at the time-slot of 11:27 AM to 11:32 AM. Optionally, the Agenda and Topics Detector 111 may utilize other sources in order to reach such determinations; for example, by retrieving the meeting data from a scheduler application or a calendar application that showed the meeting as being titled "Meeting to discuss the 2019 marketing campaign of the Acme Product in Europe".

Similarly, a Conclusions and Action Items Detector 112 may analyze the transcript of the meeting, as well as other sources of information, in order to deduce and/or determine any conclusions, decisions, and/or action-items or "to do" items that were discussed or concluded in the meeting. For example, the Conclusions and Action Items Detector 112 may determine an action item based on detecting in the meeting transcript an utterance of "As a third action item, James will research the cost of television ads in France"; or may determine a conclusion or a decision by detecting an utterance of "In conclusion, we decide not to advertise the Acme Product in sports magazines in Spain". Optionally, the Conclusions and Action Items Detector 112 may fetch or obtain data from other sources, such as, from a project management software of the organization, which may already be updated with such action items or "to do" items that were manually created by one or more of the participants; and may inject or add or insert such action items obtained from that resource into the presentation that is being automatically generated for that meeting. The system of the present invention may thus insert, into an automatically-generated presentation of a particular meeting, one or more action items or "to do" items that are obtained from a scheduling application or a calendar application or a project management application or a tasks allocation application, even though such external data was not necessarily already available during the meeting itself.

A Topics/Key Elements Summarizing Unit 113 further analyzes the transcript, optionally by utilizing Artificial Intelligence (AI) and/or Machine Learning (ML) techniques, in order to generate a summary and/or key elements of each topic that was discussed in the meeting. For example, an analysis of the transcript may indicate to the system that "budget" or "marketing campaign in Europe" was discussed from 11:27 AM until 11:32 AM; and that Participant A has spoken 60 percent of that time-slot, and mentioned in his spoken utterances "we have a first option, which is" and also "there is a second option, which is"; and may generate a summary along the line of "Participant A has presented two options for the marketing campaign in Europe, which were discussed from 11:27 AM to 11:32 AM".

A Visual Augmentation Unit 114 may analyze the transcript in order to detect particular words or phrases or names that can and/or should be augmented with a visual content-item, such as graphics or image or photograph or animation. For example, repeated utterances in the meeting regarding the marketing campaign in "France", may trigger the Visual Augmentation Unit 114 to obtain an image of the map of France or of the flag of France or of an item or monument that is typically associated with France (e.g., an image of the Eifel Tower; an image of a French bread or "baguette"); and to generate a notification that this visual component should be added, automatically, by the system to the slide or portion of the presentation that are associated with the "marketing campaign in France". Similarly, the Visual Augmentation Unit 114 may detect that a portion of the meeting has repeatedly mentioned "Senator Bob Smith", and may obtain from the Internet an image of that person (e.g., via an Image Search through a search engine), in order to augment the generated presentation with such image in the relevant portions or slides that refer to that person. Similarly, the Visual Augmentation Unit 114 may detect that a portion of the meeting had a four-minute discussion about "how can we market our Acme Product to Big-Corp"; and may obtain from the Internet an image of the logo of that corporation (Big-Corp), via an Image Search through a search engine, in order to augment the generated presentation with such image in the relevant portions or slides that refer to that corporation.

Similarly, the Visual Augmentation Unit 114 may be configured to automatically detect in the transcript positive/success indicators (e.g., an utterance such as "this was a great achievement", or an utterance of "I am glad to report that sales have tripled during the last quarter"), and to obtain from a repository or from the Internet visual content item(s) that correspond to such positive/success indicators (e.g., an arrow pointing upward; a graph showing growth; a gold medal). Similarly, the Visual Augmentation Unit 114 may be configured to automatically detect in the transcript negative/problem indicators (e.g., an utterance such as "we failed to market our product in Germany", or an utterance of "I am sad to update that our sales have decreased in half during the last quarter"), and to obtain from a repository or from the Internet visual content item(s) that correspond to such negative/failure indicators (e.g., an arrow pointing down; a graph showing decline).

A Current Events Detector and Handler 115 operates to detect in the transcript references to particular current event(s), which many meetings may include, and which often do not appear in a presentation that was prepared in advance of a meeting (if at all such presentation was prepared or would have been prepared). For example, the Current Events Detector and Handler 115 may detect multiple utterances by multiple participants, which referred to "the hurricane in Florida" or to the "municipal elections in Los Angeles"; may identify this as a current event, for example, based on an Internet search that is focused on News Items (e.g., detecting that the phrase "hurricane in Florida" has at least N search results (e.g., at least 50 search results) from the past D days (e.g., from the three days prior to the meeting date) in the News section of a search engine. The Current Events Detector and Handler 115 may then proceed to obtain from the Internet a content item about that news event, such as an article or an image that corresponds to that event; and to add such text or image or content item to the presentation being generated, or to add a hyperlink to such external content item to the presentation being generated.

Optionally, an Image & Video Analysis Unit 116 may analyze images and/or video that were captured or recorded or acquired as part of the meeting; for example, by a photo or video camera, by a fixed or mobile projector or a projecting device or system, by a slides presentation device, by a "smart board" or computerized board or blackboard or presentation board, by a computing device that can take or save screenshots of shown images, or the like. The images/video of the meeting, or portions thereof, may be analyzed by using one or more processing techniques; and the results of such processing, as well as associated data or content that may be generated or fetched from other sources, may then be incorporated into the automatically-generated presentation.

For example, an Optical Character Recognition (OCR) Unit 117 may perform OCR on captured images or video-frame(s), such as a video-frame showing the content that the presenting person had written on a smart-board or a regular board during the discussion, and may identify that he wrote "Problem: reduced profit" and "Solution: increase our marketing budget", and may extract these words as textual elements (and/or as images or image-portions) and they may be included or incorporated into the automatically-generated meeting summary.

Additionally or alternatively, a Computer Vision Unit 118 may apply a computer vision algorithm to such captured images and/or videos and/or video-frames, and may identify or recognize objects or items that are shown or presented during the meeting; for example, the meeting leader may hold a product (e.g., a box of cereal) in his hand and may describe verbally the marketing efforts that were done by the organization to market that product, and the Computer Vision Unit 118 may analyze the relevant images or video-segments or video-frames (e.g., optionally by detecting which images or video-portions are associated with the particular audio-segment that talks about that product), and may identify the product held by the speaker using computer vision, and may incorporate into the automatically-generated presentation an image of that product (e.g., extracted from the video frame; or, a higher-quality image of that product as obtained from the Internet via an image search or via a search engine, or as obtained from an internal or external repository of images or from an image-bank service).

In another example, the Image & Video Analysis Unit 116 may detect an image or a video-frame which shows an Agenda or a "list of topics" or a "to-do list" or an "action items" list, that were presented or shown during the meeting; may extract from them the relevant textual components (e.g., via OCR, or by Computer Vision); and may incorporate or add such content into the automatically-generated presentation; thereby creating automatically an Agenda slide, or a "list of topics" or "table of contents" slide, or a "summary/conclusion" slide, or a "to-do list" or "action items" slide; or thereby adding materials and text and/or images into such type(s) of automatically-generated slide(s) of the presentation that is being generated. Such content may not necessarily be available as part of the meta-data of the meeting (e.g., in the Invitation to the meeting via a calendar application or a scheduling application), yet the system may obtain and extract such data, as described, from images and/or video-portions or screen-shots that were captured during the meeting. Similarly, portions of such images or video-segments may be automatically embedded into, or inserted into, the automatically-generated presentation, in addition to (or instead of) the extracted textual content.

In some embodiments, an In-Meeting Analytics Unit 123 may analyze the data and meta-data that is available to the system and/or that was generated or processed by the system, and may generate in-meeting analytics or insights that pertain to a single particular meeting; for example: each topic/sub-topic as discussed; decisions and conclusions; action items or "to do" items, or allocation of tasks to particular persons or entities; summary; questions that need to be further researched or answered; data and meta-data about the meeting (e.g., list of participants; list of active participants who talked; list of silent participant who attended but did not talk; name of presenter(s); date and time of the meeting; date and time, or time-slots, in which each participant talks; talking time of each participant; aggregate talking time of all participants; relative ratio of talking times of participants (e.g., participant Adam talked during 40% of the meeting length, whereas participant Bob talked during 5% of the meeting length); identification of an order or a repeating order of talking (e.g., automatic identification that participant Adam, in 90 percent of his talks, has talked immediately after participant Bob; or other data or analyzed data regarding talking time of participants in the meeting or the discussion); or the like. Such data and insights may further be processed in order to be included (e.g., in textual format; or as images or visual representation, such as, an automatically-generated Pie Chart of Bar Chart that shows the talk time of each participant in that meeting) in the automatically-generated presentation that summarizes the meeting, and/or to be included as an external log or file or meta-data about the meeting, and/or to be accessible for searching and querying as described.

Similarly, in some embodiments, a Cross-Meeting Analytics Unit 124 may analyze the data and meta-data that is available to the system and/or that was generated or processed by the system, and may generate cross-meeting analytics or insights that pertain to multiple meetings in the aggregate; for example: each topic/sub-topic as discussed in such multiple meetings; a list of topics that were discussed in all the meetings; a list of topics that were discussed on only a single meeting; decisions and conclusions; action items or "to do" items, or allocation of tasks to particular persons or entities; summary; questions that need to be further researched or answered; data and meta-data about the meeting (e.g., list of participants; list of active participants who talked; list of silent participant who attended but did not talk; name of presenter(s); date and time of the meeting; date and time, or time-slots, in which each participant talks; talking time of each participant; aggregate talking time of all participants; relative ratio of talking times of participants (e.g., participant Adam talked during 40% of the meetings length, whereas participant Bob talked during 5% of the meetings length); identification of an order or a repeating order of talking (e.g., automatic identification that participant Adam, in 90 percent of his talks, has talked immediately after participant Bob; or other data or analyzed data regarding talking time of participants in the meeting or the discussion); or the like. The analysis may be performed relative to the aggregated data across multiple meetings; for example, thereby identifying and detecting that in multiple meetings, user Adam typically talks immediately after user Bob, or determining that across multiple meetings user Charles talks on average 45% of the meeting length, or the like. Such data and insights may further be processed in order to be included (e.g., in textual format; or as images or visual representation, such as, an automatically-generated Pie Chart of Bar Chart that shows the talk time of each participant in that meeting) in one or more of the automatically-generated presentation(s) that summarizes the meetings, and/or to be included as an external log or file or meta-data about the meeting(s), and/or to be accessible for searching and querying as described. In some embodiments, the cross-meeting analysis may be performed by the system, on demand, with regard to a subset of the meetings; such as, "run the cross-meeting analysis regarding all the meetings that took place in 2018", or "run the cross-meeting analysis regarding all the meetings that took place in August 2018 and that Adam participated in them", or "run the cross-meeting analysis regarding all the meetings in 2017 that discussed the topic of Budget", or the like In some embodiments, the Cross-Meeting Analytics Unit 124 may further generate insights with regard to related meetings correlation (e.g., recurrent, events) performance metrics. For example, the system may analyze and generate insights with regard to recurrent meeting AI execution time (e.g., or other performance metrics); and may indicate, for example, that current and/or previous AI execution time for a previously-processed meeting and/or for a currently-processed meeting; and optionally showing or presenting such cross-meeting data or insights side-by-side or using a Bar Chart or a Pie Chart or other visual representation.

An Automatic Presentation Generator 120 may collect the data and/or content items that was generated or detected or prepared by the other components, and may generate or create a presentation that corresponds to the meeting. For example, the Automatic Presentation Generator 120 may generate a slide with the Title of the meeting; a slide with the Agenda or Topic List of the meeting; multiple slides with summaries of each topics or sub-topics; a slide with conclusions and decisions; a slide with action items or "to do" items"; a slide with meta-data about the meeting (names and type of participants; name and role of presented/leader; time-slot of the meeting; time-slots in which each user participated; means of participation by each user). Optionally, at least one of the generated slides, or at least some of the generated slides, may comprise augmented content-item(s), such as an image of a person or a place that was discussed, or a visual or graphical content-item that corresponds to failure or success or to positive or negative indicators, or a hyperlink to a current event, or a brief description of image of a current event, or other augmented content.

The Automatic Presentation Generator 120 may operate in conjunction with a presentation meta-data generator 121, able to generate meta-data or links or tags or pointers that may be associated with particular portions of the generated presentation, and/or which may enable efficient and user-friendly searching or querying of the generated presentation. For example, an automatically-generated slide of "Action Items", may comprise three bullet-point textual phrases that correspond to three Action Items that were detected; and each of those bullet-point items may contain a hyperlink or a button or a pointer that, if engaged by the user who views the presentation, cause the system to playback the particular audio portion (and/or video portion) that corresponds to the discussion of that particular action item. Similarly, a Conclusion in the Conclusions Slide may be linked to the particular time-slot in the audio recording of the meeting, in which the presenter summarizes the conclusions of the meeting.

A query and search unit 122 may enable a user to submit queries, that are then parsed by the system in order to retrieve and display (or play-back) the particular presentations and/or the particular presentation-portions or slide(s) that match such queries. For example, the query and search unit 122 may present a free-text query field, or an advanced search interrace that utilizes multiple fields and Boolean operators (e.g., "Agenda=Marketing" and "Participants=Rachel" and "Date=in 2018"; or, "Date=in November 2018" and "Action Items allocated to=Rachel"). The query and search unit 122 may analyze the automatically-generated presentation(s) or slides, and/or the original transcript of the meeting or discussion, in order to generate the search results and to make them accessible for viewing/consumption by the querying user.

The above-mentioned units or modules of the system may be implemented using, for example, a Processor 141, a Memory Unit 142, a Storage Unit 143, an Input Unit 144 (e.g., keyboard, keypad, touch-screen, microphone, mouse, touch-pad, smart-board), an Output Unit 145 (e.g., screen, touch-screen, projector, display unit, monitor, television, audio speakers), one or more transceivers 146 (e.g., Wi-Fi transceiver, cellular transceiver, Bluetooth transceiver), one or more wired and/or wireless communication modules (e.g., Network Interface Card (NIC), network adapter, modem), and/or other suitable hardware components and/or software components. Optionally, an Exporter/Converter Unit 149 may export of convert the automatically-generated presentation (and/or other insights or data or meta-data) into one or more suitable formats or file structures or data structures, for example, as a PowerPoint presentation file, as a Microsoft Word file, as a Microsoft Excel file, as a PDF file, as a Comma Separated Values (CSV) file, or the like.

In some embodiments, a method comprises: obtaining or capturing or receiving an audio recording of a meeting; obtaining or generating or receiving a transcript of said meeting from said audio recording; automatically generating a visual presentation that corresponds to particular key elements in said meeting. Key Elements of the meeting may include one or more of the above-discussed data-items, such as, agenda, topics, conclusions, action-items, to-do list, participants, meeting meta-data, participants, leader, topics, or the like.

In some embodiments, the method comprises: based on textual analysis of said transcript, determining a main topic of said meeting; and generating a slide in said visual presentation that comprises said main topic.

In some embodiments, the method comprises: based on analysis of meeting scheduling data, determining a main topic of said meeting; and generating a slide in said visual presentation that comprises said main topic.

In some embodiments, the method comprises: determining at least one topic that was discussed in said meeting, based on textual analysis of said transcript; generating a slide in said visual presentation that comprises said topic, and further comprises a textual summary of utterances about said topic in said meeting.

In some embodiments, the method comprises: determining at least one topic that was discussed in said meeting, based on analysis of scheduling data of said meeting; generating a slide in said visual presentation that comprises said topic, and further comprises a textual summary of utterances about said topic in said meeting.

In some embodiments, the method comprises: based on textual analysis of said meeting, determining at least one conclusion that was conclude in said meeting; generating a slide in said visual presentation that comprises said conclusion.

In some embodiments, the method comprises: based on textual analysis of said meeting, determining at least one action item that was allocated in said meeting; generating a slide in said visual presentation that comprises said action item.

In some embodiments, the method comprises: detecting a correlation between (i) a portion of the transcript of the meeting that discussed a particular action item, and (ii) data of an application that manages allocated action items; based on said correlation, determining that said particular action item was allocated in said meeting; generating a slide in said visual presentation that comprises said particular action item.

In some embodiments, the method comprises: based on textual analysis of said meeting, determining at least one person that was discussed in said meeting; obtaining from a repository an image of said person; generating a slide in said visual presentation that comprises at least said image of said person.

In some embodiments, the method comprises: based on textual analysis of said meeting, determining at least one corporation that was discussed in said meeting; obtaining from a repository an image of a logo of said corporation; generating a slide in said visual presentation that comprises at least said image of said logo of said corporation.

In some embodiments, the method comprises: based on textual analysis of said meeting, determining at least one product that was discussed in said meeting; obtaining from a repository an image of said product; generating a slide in said visual presentation that comprises at least said image of said product.

In some embodiments, the method comprises: based on textual analysis of said meeting, determining at least one geographical location that was discussed in said meeting; obtaining from a repository an image of said geographical location; generating a slide in said visual presentation that comprises at least said image of said geographical location.

In some embodiments, the method comprises: based on textual analysis of said meeting, determining a recent news event that was discussed in said meeting; obtaining from a repository an image that corresponds to said recent news event; generating a slide in said visual presentation that comprises at least said image of said recent news event.

In some embodiments, the method comprises: based on textual analysis of said meeting, determining a recent news event that was discussed in said meeting; obtaining from a repository a hyperlink to a news article about said recent news event; generating a slide in said visual presentation that comprises at least said hyperlink to the news article about said recent news event.

In some embodiments, the method comprises: determining a real-life identity of a presenter of said meeting; generating a slide in said visual presentation that comprises at least said real-life identity of said presenter of said meeting.

In some embodiments, the method comprises: generating a plurality of slides in said visual presentation, wherein a first slide comprises: (i) a summary of a first topic, and (ii) a first User Interface element that, when engaged, causes the method to play-back a first portion of an audio recording of said meeting that corresponds to said first topic; wherein a second slide comprises: (i) a summary of a second topic, and (ii) a second User Interface element that, when engaged, causes the method to play-back a second portion of the audio recording of said meeting that corresponds to said second topic.

In some embodiments, the method comprises: generating a plurality of slides in said visual presentation, wherein a first slide comprises: (i) a summary of a first topic, and (ii)

a first User Interface element that, when engaged, causes the method to display a first portion of the transcript of said meeting that corresponds to said first topic; wherein a second slide comprises: (i) a summary of a second topic, and (ii) a second User Interface element that, when engaged, causes the method to display a second portion of the transcript of said meeting that corresponds to said second topic.

In some embodiments, the method comprises: receiving a request to find a meeting-portion that corresponds to criteria indicated in a particular search query; performing a search through data and meta-data of said visual presentation, based on said criteria; displaying to a user a particular slide of the visual presentation, which corresponds to the meeting-portion that corresponds to said criteria that were indicated in said particular search query.

Some embodiments may comprise a non-transitory storage medium having stored thereon instructions that, when executed by a hardware processor, cause the hardware processor to perform a method as described above.

Some embodiments may comprise an apparatus comprising a hardware processor configured to perform a method as described above.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The present invention may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

The present invention may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
   obtaining an audio recording of a meeting;
   obtaining a transcript of said meeting from said audio recording;
   automatically generating a visual presentation that corresponds to particular key elements in said meeting, wherein said visual presentation comprises a plurality of slides,
   wherein a first automatically-generated slide comprises: (i) a summary of a first topic, and (ii) a first User Interface element that, when engaged, causes a play-back of a first particular portion of an audio recording of said meeting that corresponds to said first topic;
   wherein a second automatically-generated slide comprises: (i) a summary of a second topic, and (ii) a second User Interface element that, when engaged, causes a play-back of a second particular portion of the audio recording of said meeting that corresponds to said second topic;
   wherein upon user actuation of said first User Interface element, that is comprised within said first automatically-generated slide, the method comprises: causing play-back of said first particular portion of the audio recording of said meeting which corresponds to said first topic, wherein said first topic is one of said particular key elements that are automatically generated as topics within said visual presentation;
   wherein upon user actuation of said second User Interface element, that is comprised within said second automatically-generated slide, the method comprises: causing play-back of said second particular portion of the audio recording of said meeting which corresponds to said second topic, wherein said second topic is one of said particular key elements that are automatically generated as topics within said visual presentation.

2. The method of claim 1, comprising:
   based on textual analysis of said transcript, determining a main topic of said meeting; and generating a slide in said visual presentation that comprises said main topic.

3. The method of claim 1, comprising:
based on analysis of meeting scheduling data, determining a main topic of said meeting; and generating a slide in said visual presentation that comprises said main topic.

4. The method of claim 1, comprising:
determining at least one topic that was discussed in said meeting, based on textual analysis of said transcript;
generating a slide in said visual presentation that comprises said topic, and further comprises a textual summary of utterances about said topic in said meeting.

5. The method of claim 1, comprising:
determining at least one topic that was discussed in said meeting, based on analysis of scheduling data of said meeting;
generating a slide in said visual presentation that comprises said topic, and further comprises a textual summary of utterances about said topic in said meeting.

6. The method of claim 1, comprising:
based on textual analysis of said meeting, determining at least one conclusion that was conclude in said meeting;
generating a slide in said visual presentation that comprises said conclusion.

7. The method of claim 1, comprising:
based on textual analysis of said meeting, determining at least one action item that was allocated in said meeting;
generating a slide in said visual presentation that comprises said action item.

8. The method of claim 1, comprising:
detecting a correlation between (i) a portion of the transcript of the meeting that discussed a particular action item, and (ii) data of an application that manages allocated action items;
based on said correlation, determining that said particular action item was allocated in said meeting;
generating a slide in said visual presentation that comprises said particular action item.

9. The method of claim 1, comprising:
based on textual analysis of said meeting, determining at least one person that was discussed in said meeting;
obtaining from a repository an image of said person;
generating a slide in said visual presentation that comprises at least said image of said person.

10. The method of claim 1, comprising:
based on textual analysis of said meeting, determining at least one corporation that was discussed in said meeting;
obtaining from a repository an image of a logo of said corporation;
generating a slide in said visual presentation that comprises at least said image of said logo of said corporation.

11. The method of claim 1, comprising:
based on textual analysis of said meeting, determining at least one product that was discussed in said meeting;
obtaining from a repository an image of said product;
generating a slide in said visual presentation that comprises at least said image of said product.

12. The method of claim 1, comprising:
based on textual analysis of said meeting, determining at least one geographical location that was discussed in said meeting;
obtaining from a repository an image of said geographical location;
generating a slide in said visual presentation that comprises at least said image of said geographical location.

13. The method of claim 1, comprising:
based on textual analysis of said meeting, determining a recent news event that was discussed in said meeting;
obtaining from a repository an image that corresponds to said recent news event;
generating a slide in said visual presentation that comprises at least said image of said recent news event.

14. The method of claim 1, comprising:
based on textual analysis of said meeting, determining a recent news event that was discussed in said meeting;
obtaining from a repository a hyperlink to a news article about said recent news event;
generating a slide in said visual presentation that comprises at least said hyperlink to the news article about said recent news event.

15. The method of claim 1, comprising:
determining a real-life identity of a presenter of said meeting;
generating a slide in said visual presentation that comprises at least said real-life identity of said presenter of said meeting.

16. The method of claim 1, comprising:
generating a plurality of slides in said visual presentation,
wherein a first slide comprises: (i) a summary of a first topic, and (ii) a first User Interface element that, when engaged, causes the method to display a first portion of the transcript of said meeting that corresponds to said first topic;
wherein a second slide comprises: (i) a summary of a second topic, and (ii) a second User Interface element that, when engaged, causes the method to display a second portion of the transcript of said meeting that corresponds to said second topic.

17. The method of claim 1, comprising:
receiving a request to find a meeting-portion that corresponds to criteria indicated in a particular search query;
performing a search through data and meta-data of said visual presentation, based on said criteria;
displaying to a user a particular slide of the visual presentation, which corresponds to the meeting-portion that corresponds to said criteria that were indicated in said particular search query.

18. A non-transitory storage medium having stored thereon instructions that, when executed by a hardware processor, cause the hardware processor to perform a method comprising:
obtaining an audio recording of a meeting;
obtaining a transcript of said meeting from said audio recording;
automatically generating a visual presentation that corresponds to particular key elements in said meeting, wherein said visual presentation comprises a plurality of slides,
wherein a first automatically-generated slide comprises: (i) a summary of a first topic, and (ii) a first User Interface element that, when engaged, causes a play-back of a first particular portion of an audio recording of said meeting that corresponds to said first topic;
wherein a second automatically-generated slide comprises: (i) a summary of a second topic, and (ii) a second User Interface element that, when engaged, causes a play-back of a second particular portion of the audio recording of said meeting that corresponds to said second topic;
wherein upon user actuation of said first User Interface element, that is comprised within said first automatically-generated slide, the method comprises: causing play-back of said first particular portion of the audio recording of said meeting which corresponds to said first topic, wherein said first topic is one of said particular key elements that are automatically generated as topics within said visual presentation;

wherein upon user actuation of said second User Interface element, that is comprised within said second automatically-generated slide, the method comprises: causing play-back of said second particular portion of the audio recording of said meeting which corresponds to said second topic, wherein said second topic is one of said particular key elements that are automatically generated as topics within said visual presentation.

19. An apparatus comprising:

a hardware processor configured to perform a method comprising:

obtaining an audio recording of a meeting;

obtaining a transcript of said meeting from said audio recording;

automatically generating a visual presentation that corresponds to particular key elements in said meeting, wherein said visual presentation comprises a plurality of slides, wherein a first automatically-generated slide comprises: (i) a summary of a first topic, and (ii) a first User Interface element that, when engaged, causes a play-back of a first particular portion of an audio recording of said meeting that corresponds to said first topic;

wherein a second automatically-generated slide comprises: (i) a summary of a second topic, and (ii) a second User Interface element that, when engaged, causes a play-back of a second particular portion of the audio recording of said meeting that corresponds to said second topic;

wherein upon user actuation of said first User Interface element, that is comprised within said first automatically-generated slide, the method comprises: causing play-back of said first particular portion of the audio recording of said meeting which corresponds to said first topic, wherein said first topic is one of said particular key elements that are automatically generated as topics within said visual presentation;

wherein upon user actuation of said second User Interface element, that is comprised within said second automatically-generated slide, the method comprises: causing play-back of said second particular portion of the audio recording of said meeting which corresponds to said second topic, wherein said second topic is one of said particular key elements that are automatically generated as topics within said visual presentation.

* * * * *